United States Patent
Kawakami et al.

(10) Patent No.: US 10,983,421 B2
(45) Date of Patent: Apr. 20, 2021

(54) PROJECTION SYSTEM, VIDEO IMAGE CONVERTER, PROJECTOR, CRADLE, VIDEO IMAGE CONVERSION METHOD, AND VIDEO IMAGE PROJECTION METHOD

(71) Applicant: SONY CORPORATION, Tokyo (JP)

(72) Inventors: Hiro Kawakami, Tokyo (JP); Takashi Norizuki, Chiba (JP); Minako Kawata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/080,850

(22) PCT Filed: Dec. 8, 2016

(86) PCT No.: PCT/JP2016/086562
§ 371 (c)(1),
(2) Date: Aug. 29, 2018

(87) PCT Pub. No.: WO2017/154298
PCT Pub. Date: Sep. 14, 2017

(65) Prior Publication Data
US 2019/0025678 A1    Jan. 24, 2019

(30) Foreign Application Priority Data
Mar. 10, 2016    (JP) .............................. JP2016-046729

(51) Int. Cl.
*G03B 21/14* (2006.01)
*H04N 5/74* (2006.01)
(Continued)

(52) U.S. Cl.
CPC .......... *G03B 21/142* (2013.01); *G03B 21/00* (2013.01); *G03B 21/14* (2013.01); *G03B 21/147* (2013.01);
(Continued)

(58) Field of Classification Search
CPC ...... G02B 21/00; G03B 21/14; G03B 21/142; G09G 5/00; G09G 5/36; H04N 5/74; F03B 21/147
See application file for complete search history.

(56) References Cited

FOREIGN PATENT DOCUMENTS

| JP | 09-149296 A | 6/1997 |
|----|----|----|
| JP | 9-149296 A | 6/1997 |

(Continued)

OTHER PUBLICATIONS

International Search Report and Written Opinion of PCT Application No. PCT/JP2016/086562, dated Mar. 7, 2017, 13 pages of ISRWO.

(Continued)

*Primary Examiner* — Michelle M Iacoletti
*Assistant Examiner* — Danell L Owens
(74) *Attorney, Agent, or Firm* — Chip Law Group

(57) ABSTRACT

Provided is a video image converter that generates attitude data of a projector based on motion data in projecting moving picture data, stores the attitude data in a storage unit, corrects the moving picture data based on the attitude data, and stores the corrected moving picture data in the storage unit. The projector plays back the corrected moving picture data stored in the storage unit and projects the corrected moving picture data onto a projection plane. A cradle supports the projector and changes an attitude of the projector based on the attitude data stored in the storage unit.

8 Claims, 16 Drawing Sheets

(51) Int. Cl.
  *G03B 21/00* (2006.01)
  *G09G 5/36* (2006.01)
  *G09G 5/00* (2006.01)

(52) U.S. Cl.
  CPC ............... *G09G 5/00* (2013.01); *G09G 5/36* (2013.01); *H04N 5/74* (2013.01)

(56) References Cited

FOREIGN PATENT DOCUMENTS

| | | | |
|---|---|---|---|
| JP | 11-027608 A | 1/1999 |
| JP | 11-27608 A | 1/1999 |
| JP | 2005-309213 A | 11/2005 |
| JP | 2006-091111 A | 4/2006 |
| JP | 2011-203286 A | 10/2011 |
| JP | 2011-217307 A | 10/2011 |

OTHER PUBLICATIONS

Office Action for JP Patent Application No. 2018-504006 dated Feb. 2, 2021, 6 pages of Office Action and 6 pages of English Translation.

FIG. 6

| TIME STAMP | COORDINATES |
|---|---|
| 00:00:00, 00 | (0, 0) |
| 00:00:00, 01 | (−0.2, 0) |
| 00:00:00, 02 | (−0.4, 0) |
| 00:00:00, 03 | (−0.6, 0) |
| 00:00:00, 04 | (−0.8, 0) |
| 00:00:00, 05 | (−1, 0) |
| ⋮ | ⋮ |

FIG. 7

| TIME STAMP | COORDINATES | INTERPOLATION METHOD |
|---|---|---|
| 00:00:00, 00 | (0, 0) | Linear |
| 00:00:00, 05 | (−1, 0) | — |
| ⋮ | ⋮ | ⋮ |

FIG. 10

| TIME STAMP | ROTATION ANGLE |
|---|---|
| 00:00:00, 00 | (0, 0) |
| 00:00:00, 01 | ($\theta 1$, $\phi 1$) |
| 00:00:00, 02 | ($\theta 2$, $\phi 2$) |
| 00:00:00, 03 | ($\theta 3$, $\phi 3$) |
| 00:00:00, 04 | ($\theta 4$, $\phi 4$) |
| 00:00:00, 05 | ($\theta 5$, $\phi 5$) |
| ⋮ | ⋮ |

FIG. 11

| TIME STAMP | ROTATION ANGLE | ATTITUDE VELOCITY |
|---|---|---|
| 00:00:00, 00 | (0, 0) | ($\theta$v, $\phi$v) |
| 00:00:00, 05 | ($\theta$5, $\phi$5) | (0, 0) |
| ⋮ | ⋮ | ⋮ |

FIG. 12
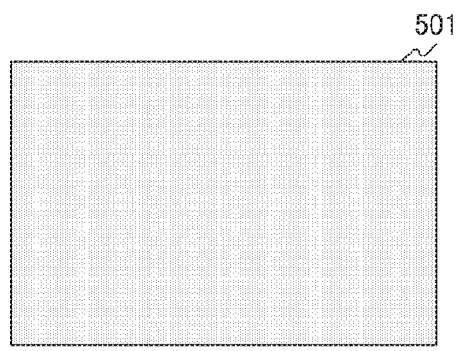
VIDEO IMAGE
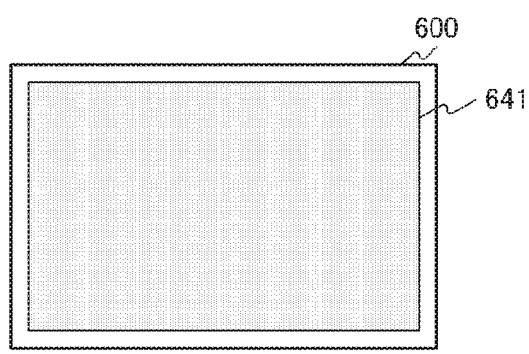
SCREEN PICTURE
(PROJECTION POSITION (0, 0))

FIG. 13
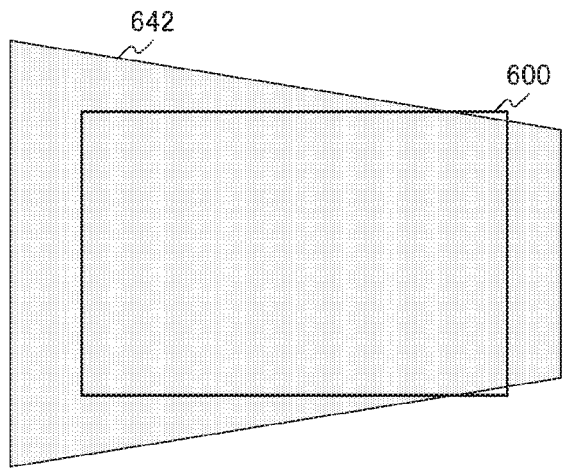
SCREEN PICTURE BEFORE CORRECTION
(PROJECTION POSITION (-1, 0))
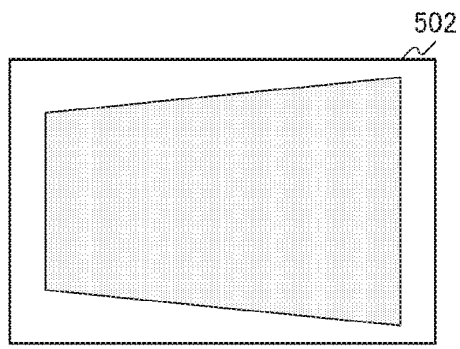
CORRECTED VIDEO IMAGE
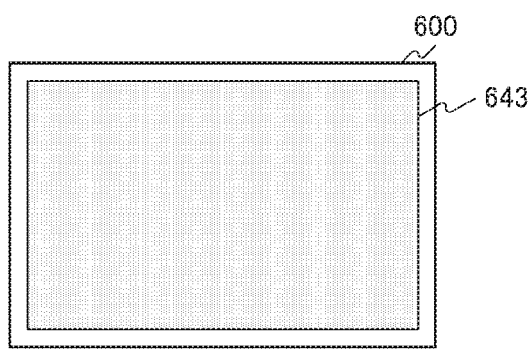
SCREEN PICTURE AFTER CORRECTION
(PROJECTION POSITION (-1, 0))

PROJECTION SYSTEM, VIDEO IMAGE CONVERTER, PROJECTOR, CRADLE, VIDEO IMAGE CONVERSION METHOD, AND VIDEO IMAGE PROJECTION METHOD

CROSS REFERENCE TO RELATED APPLICATIONS

This application is a U.S. National Phase of International Patent Application No. PCT/JP2016/086562 filed on Dec. 8, 2016, which claims priority benefit of Japanese Patent Application No. JP 2016-046729 filed in the Japan Patent Office on Mar. 10, 2016. Each of the above-referenced applications is hereby incorporated herein by reference in its entirety.

TECHNICAL FIELD

The present technology relates to projection systems, and more particularly to a projection system for projection with a change in the projector's attitude, a video image converter, a projector, and a cradle, and to a method of processing the same and a program causing a computer to execute the method.

BACKGROUND ART

A projector that projects moving picture data onto a projection plane is commonly known. A technique for correcting trapezoidal distortion depending on the projector's angle in a case where a projection plane is not perpendicular to a projection optical axis is developed for the projector in related art (e.g., see Patent Literature 1).

CITATION LIST

Patent Literature

Patent Literature 1: JP 2006-091111A

DISCLOSURE OF INVENTION

Technical Problem

In the technique in related art as described above, the trapezoidal distortion is corrected depending on the projector's angle. If such correction is performed in real time during projection, however, the load in playing back a moving picture is increased, which leads to necessity of providing a projector with an advanced picture processing function.

The present technology is made in view of such a situation, and it is intended to suppress the load in playing back a moving picture in a projector having no advanced picture processing function.

Solution to Problem

The present technology has been made to solve the above problem. According to a first aspect of the present technology, a projection system includes: a video image converter configured to generate attitude data of a projector on a basis of motion data in projecting moving picture data, store the attitude data in a storage unit, correct the moving picture data in accordance with the attitude data, and store the corrected moving picture data in the storage unit; the projector configured to play back the corrected moving picture data stored in the storage unit and project the corrected moving picture data onto a projection plane; and a cradle configured to support the projector and change an attitude of the projector in accordance with the attitude data stored in the storage unit. This produces an effect that the generation and correction of the attitude data are completed before projection, thereby suppressing the load in playing back the moving picture.

In addition, according to the first aspect, the video image converter may include a conversion synchronization unit configured to synchronize the moving picture data with the motion data, a conversion unit configured to convert the motion data into the attitude data, and a correction unit configured to correct the moving picture data in accordance with the motion data to generate the corrected moving picture data. This produces an effect that the generation and correction of the attitude data are performed separately from the projection. In this case, the correction unit may correct distortion of the moving picture data in the projection plane in accordance with the motion data. This produces an effect of removing the distortion at the time of projection in advance.

In addition, according to the first aspect, the projector may include a moving picture playback unit configured to play back the corrected moving picture data stored in the storage unit, a projection synchronization unit configured to synchronize the played video image with the attitude data stored in the storage unit, a projection unit configured to project the synchronized video image onto the projection plane, and an attitude data supply unit configured to supply the synchronized attitude data to the cradle. This produces an effect of suppressing the load without the generation and correction of the attitude data in playing back the moving picture.

In addition, according to the first aspect, the cradle may include a moving picture playback unit configured to play back the corrected moving picture data stored in the storage unit, a projection synchronization unit configured to synchronize the played video image with the attitude data stored in the storage unit, a video image supply unit configured to supply the synchronized video image to the projector, and an attitude control unit configured to control an attitude of the projector in accordance with the synchronized attitude data. This produces an effect of supplying the video image from the cradle to the projector.

In addition, according to a second aspect of the present technology, there is provided a video image converter and a video image conversion method thereof. The video image converter includes: a conversion synchronization unit configured to synchronize moving picture data with motion data in projecting the moving picture data; a conversion unit configured to generate attitude data of a projector on a basis of the motion data and store the attitude data in a storage unit; and a correction unit configured to correct the moving picture data in accordance with the motion data and store the corrected moving picture data in the storage unit. This produces an effect that the generation and correction of the attitude data are completed before projection, thereby suppressing the load in playing back the moving picture.

In addition, according to a third aspect of the present technology, there is provided a projector and a video image projection method thereof. The projector includes: a moving picture playback unit configured to play back moving picture data stored in a storage unit; a projection synchronization unit configured to synchronize the played video image with attitude data stored in the storage unit; a projection unit configured to project the synchronized video image onto the projection plane; and an attitude data supply unit configured to supply the synchronized attitude data to a mounting-target cradle. This produces an effect of suppressing the load without the generation and correction of the attitude data in playing back the moving picture.

In addition, according to a fourth aspect of the present technology, a cradle includes: a moving picture playback unit configured to play back moving picture data stored in a storage unit; a projection synchronization unit configured to synchronize the played video image with attitude data of a projector stored in the storage unit; a video image supply unit configured to supply the synchronized video image to the projector; and an attitude control unit configured to control an attitude of the projector in accordance with the synchronized attitude data. This produces an effect of supplying the video image from the cradle to the projector.

Advantageous Effects of Invention

According to the present technology, it is possible to achieve an advantageous effect capable of suppressing the load in playing back a moving picture in a projector having no advanced picture processing function. Note that effects described herein are not necessarily limitative and any effect that is desired to be described in the present disclosure may be admitted.

BRIEF DESCRIPTION OF DRAWINGS

FIG. 6 is a diagram illustrating a first example of projection motion data 20 according to an embodiment of the present technology.

FIG. 7 is a diagram illustrating a second example of the projection motion data 20 according to an embodiment of the present technology.

FIG. 10 is a diagram illustrating a first example of attitude data 40 according to an embodiment of the present technology.

FIG. 11 is a diagram illustrating a second example of the attitude data 40 according to an embodiment of the present technology.

FIG. 12 is a diagram illustrating an example of a projected image at coordinates (0,0) by the projector 200 according to an embodiment of the present technology.

FIG. 13 is a diagram illustrating an example of a projected image at coordinates (−1,0) by the projector 200 according to an embodiment of the present technology.

MODE(S) FOR CARRYING OUT THE INVENTION

Modes for carrying out the present technology (hereinafter referred to as embodiments) will be described below. The description is given in the following order.
1. Embodiment (an example of supplying attitude control data from a projector to a cradle)
2. Modification (an example of supplying video image data from a cradle to a projector)

1. Embodiment

Figure 1:
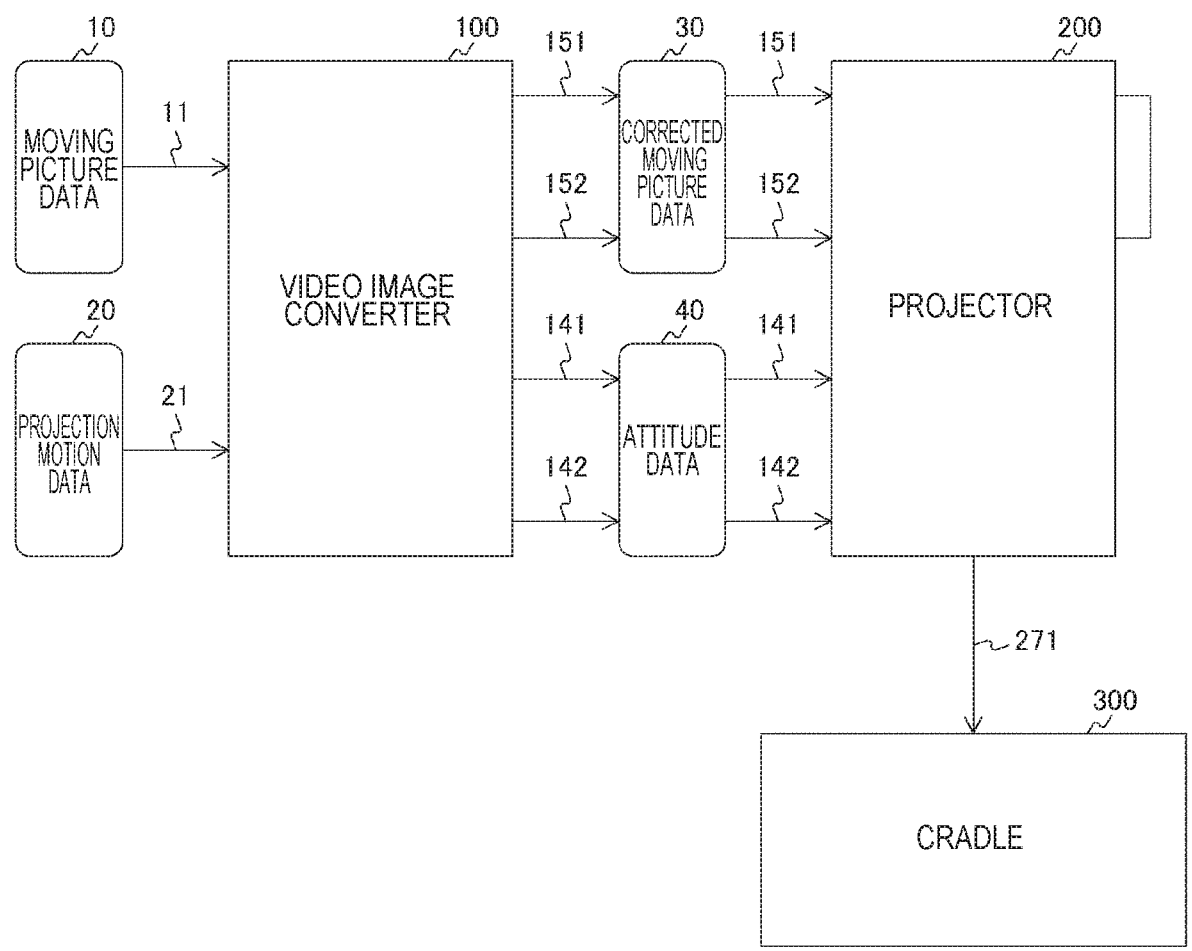
FIG. 1 is a diagram illustrating an exemplary overall configuration of a projection system according to an embodiment of the present technology.

[Configuration of Projection System]
FIG. 1 is a diagram illustrating an exemplary overall configuration of a projection system according to an embodiment of the present technology. The projection system includes a video image converter 100, a projector 200, and a cradle 300.

The video image converter 100 converts moving picture data 10 and projection motion data 20 in projecting the moving picture data 10 into corrected moving picture data 30 and attitude data 40 of the projector 200, respectively. The video image converter 100 generates the attitude data 40 of the projector on the basis of the projection motion data 20 and stores it in a storage unit (not shown). In addition, the video image converter 100 corrects the moving picture data 10 in accordance with the attitude data 40 and stores it in the storage unit as the corrected moving picture data 30.

The projector 200 plays back the corrected moving picture data 30 stored in the storage unit and projects it onto the projection plane. The projector 200 is mounted on the cradle 300 at the time of projection. The projector 200 supplies the attitude data 40 stored in the storage unit to the cradle 300.

The cradle 300 is used to mount the projector 200 thereon and supports it. The cradle 300 changes the attitude of the projector 200 in accordance with the attitude data supplied from the projector 200.

Figure 2:
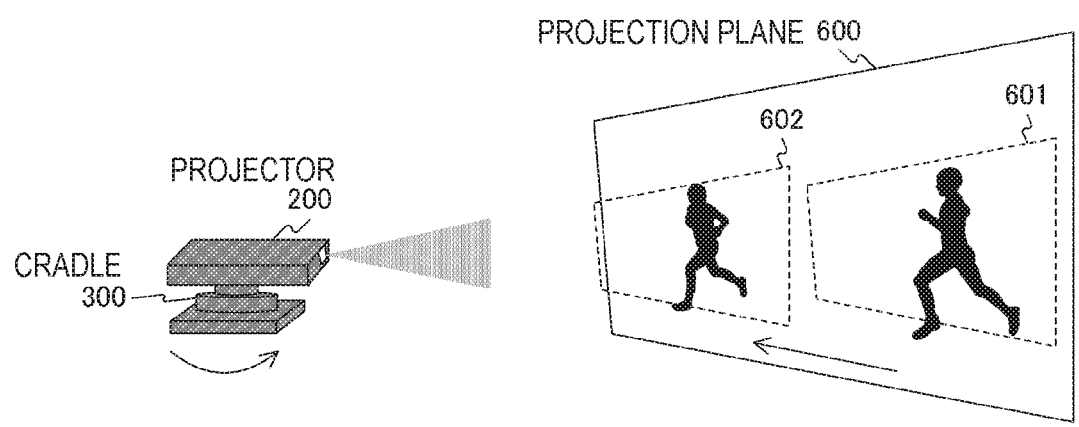
FIG. 2 is a diagram illustrating an example of an image at the time of projection by the projection system according to an embodiment of the present technology.

FIG. 2 is a diagram illustrating an example of an image at the time of projection by the projection system according to the embodiment of the present technology.

The projector 200 is mounted on the cradle 300. The cradle 300 is rotatable up, down, left, and right in accordance with the attitude data supplied from the projector 200. In other words, the attitude of the projector 200 is changed by the operation of the cradle 300.

In one example, in a case where the cradle 300 is rotated counterclockwise, a video image 601 projected from the projector 200 onto a projection plane 600 shifts to the position of a video image 602 in the left direction. This allows the video image intended by an original video image producer to be projected. In other words, it is possible to obtain video image representation exceeding the size of the video image projected from the projector 200.

Figure 3:
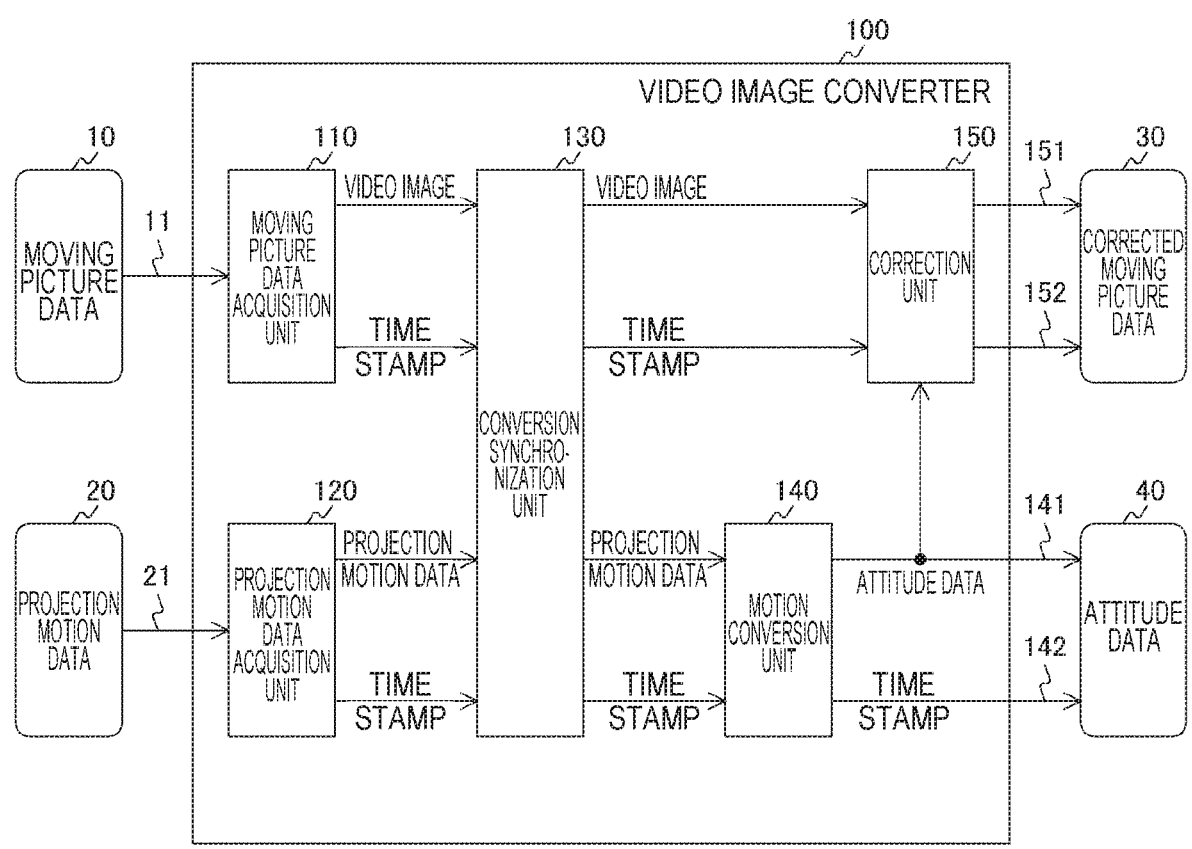
FIG. 3 is a diagram illustrating an exemplary configuration of a video image converter 100 according to an embodiment of the present technology.

FIG. 3 is a diagram illustrating an exemplary configuration of the video image converter 100 according to the embodiment of the present technology. The video image converter 100 includes a moving picture data acquisition unit 110, a projection motion data acquisition unit 120, a conversion synchronization unit 130, a motion conversion unit 140, and a correction unit 150.

The moving picture data acquisition unit 110 acquires the moving picture data 10 and outputs the frame video image and its time stamp. The moving picture data acquisition unit 110 acquires the moving picture data 10 from the storage unit via a signal line 11. The moving picture data 10 is composed of frame video images arranged in time series, and the frame video images have their respective time stamps. The moving picture data acquisition unit 110 outputs the acquired frame video image and time stamp to the conversion synchronization unit 130.

The projection motion data acquisition unit 120 acquires the projection motion data 20 and outputs the projection motion data and its time stamp. The projection motion data acquisition unit 120 acquires the projection motion data 20 from the storage unit via a signal line 21. The projection motion data 20 is composed of motion data in projecting frame video images arranged in time series, and the projection motion data have their respective time stamps. The projection motion data acquisition unit 120 outputs the acquired the projection motion data and time stamp to the conversion synchronization unit 130.

The conversion synchronization unit 130 synchronizes the frame video image of the moving picture data output from the moving picture data acquisition unit 110 with the projection motion data output from the projection motion data acquisition unit 120 in accordance with their respective time stamps. The conversion synchronization unit 130 outputs the frame video images of the moving picture data and the projection motion data, which have the same time stamp, together with their respective time stamps.

The motion conversion unit 140 converts the projection motion data output from the conversion synchronization unit 130 into attitude data of the projector 200. The motion conversion unit 140 supplies the converted attitude data to the correction unit 150. In addition, the attitude data converted by the motion conversion unit 140 and the time stamp are stored, as the attitude data 40, in the storage unit via signal lines 141 and 142, respectively. The motion conversion unit 140 is an example of a conversion unit set forth in the claims.

The correction unit 150 corrects the frame video image of the moving picture data output from the conversion synchronization unit 130 in accordance with the attitude data supplied from the motion conversion unit 140. The frame video image corrected by the correction unit 150 and the time stamp are stored, as the corrected moving picture data 30, in the storage unit via signal lines 151 and 152, respectively.

In this way, the video image converter 100 converts the moving picture data 10 and the projection motion data 20 into the corrected moving picture data 30 and the attitude data 40, respectively, and it stores them in the storage unit. Accordingly, the correction for distortion of the moving picture data and the conversion into the attitude data of the projector 200 are performed before the projection by the projector 200. Thus, it is possible to suppress the load in playing back the moving picture in the projector 200.

Figure 4:
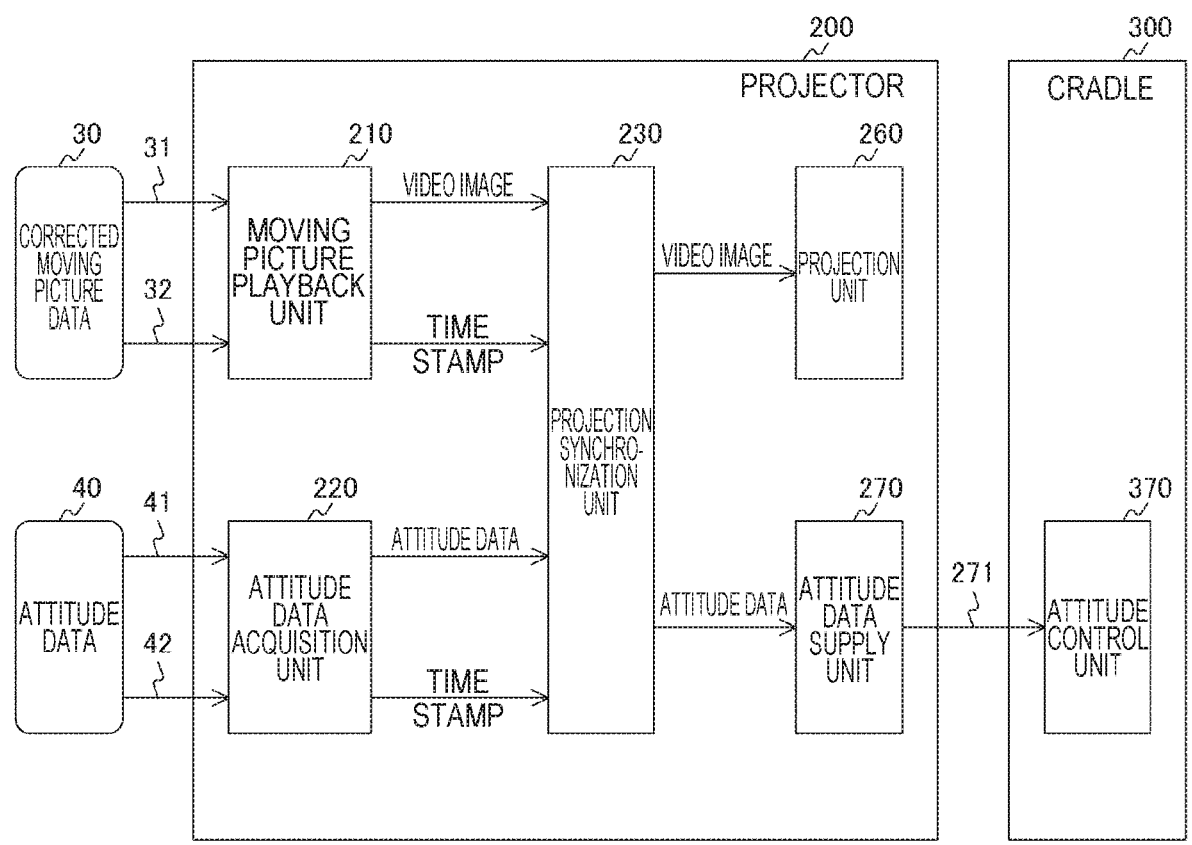
FIG. 4 is a diagram illustrating an exemplary configuration of a projector 200 according to an embodiment of the present technology.

FIG. 4 is a diagram illustrating an exemplary configuration of the projector 200 according to the embodiment of the present technology. The projector 200 includes a moving picture playback unit 210, an attitude data acquisition unit 220, a projection synchronization unit 230, a projection unit 260, and an attitude data supply unit 270.

The moving picture playback unit 210 plays back the corrected moving picture data 30 stored in the storage unit. The moving picture playback unit 210 acquires the corrected moving picture data 30 from the storage unit via signal lines 31 and 32, and plays back it. The corrected moving picture data 30 is composed of frame video images arranged in time series, and the frame video images have their respective time stamps. The frame video image played back by the moving picture playback unit 210 and the time stamp are output to the projection synchronization unit 230.

The attitude data acquisition unit 220 acquires the attitude data 40 stored in the storage unit and outputs the attitude data and its time stamp. The attitude data acquisition unit 220 acquires the attitude data 40 from the storage unit via signal lines 41 and 42. The attitude data 40 is composed of attitude data of the projector 200 in projecting frame video images arranged in time series, and the attitude data have their respective time stamps. The attitude data acquisition unit 220 outputs the acquired attitude data and time stamp to the projection synchronization unit 230.

The projection synchronization unit 230 synchronizes the frame video image of the moving picture data played back by the moving picture playback unit 210 with the attitude data acquired by the attitude data acquisition unit 220 in accordance with their respective time stamps. The projection synchronization unit 230 outputs the frame video image of the moving picture data and the attitude data, which have the same time stamp. Unlike the conversion synchronization unit 130, the projection synchronization unit 230 is necessary to perform processing in real time during projection. In addition, the output of the projection synchronization unit 230 is output to the projection unit 260 or the cradle 300 in real time, so it is also possible to perform control such as outputting the attitude data earlier depending on the response speed of the cradle 300.

The projection unit 260 projects the frame video images of the moving picture data, which are synchronized by the projection synchronization unit 230, onto the projection plane.

The attitude data supply unit 270 supplies the attitude data synchronized by the projection synchronization unit 230 to the cradle 300 via a signal line 241. In the cradle 300 receiving the attitude data, the attitude control unit 370 controls the attitude of the projector 200 in accordance with the attitude data.

In this way, it is possible to suppress the load in playing back the moving picture without necessitating for the projector 200 to perform the distortion correction or the processing for conversion to the attitude data.

[Projection Motion Data]

Figure 5:
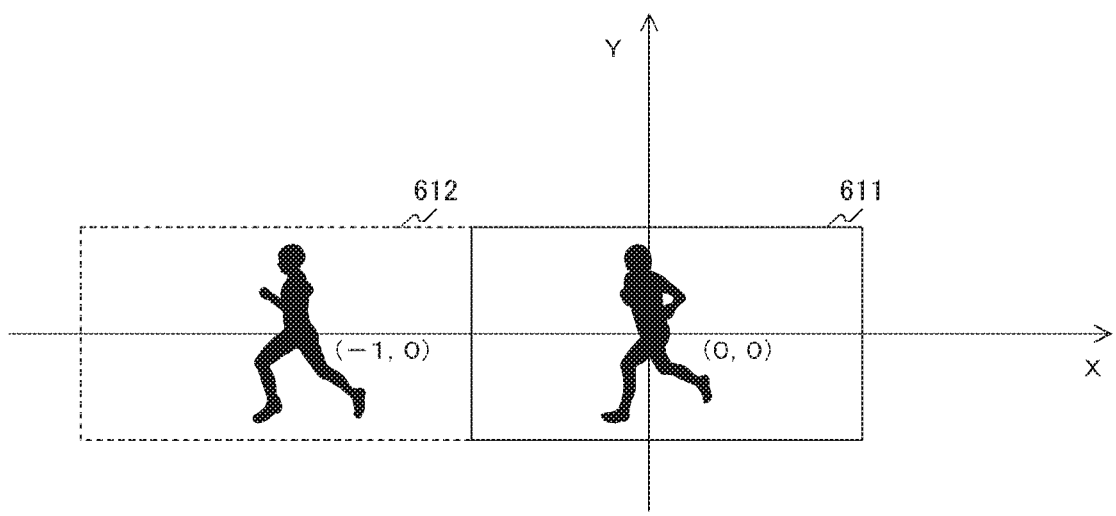
FIG. 5 is a diagram illustrating an example of coordinates of projection motion data according to an embodiment of the present technology.

FIG. 5 is a diagram illustrating an example of coordinates of the projection motion data according to the embodiment of the present technology. There is no absolute reference for the projection position, so, here as an example, the case of projection on the front with respect to the wall is taken as a video image 611 of a reference projection plane. Then, the center of the reference projection plane is set as a reference point, and a coordinate system having virtually the horizontal direction as the X-axis and the vertical direction as the Y-axis is set.

Further, as a unit of the coordinate system, one piece of the projection plane in each axis is considered as one unit. In one example, if the coordinates of the reference point are (0,0), the coordinates of a video image 612 in the projection plane shifted by one screen in the negative direction of the X-axis are (−1,0).

FIG. 6 is a diagram illustrating a first example of the projection motion data 20 according to the embodiment of the present technology. In the first example of the projection motion data 20, the time stamp and the coordinates of the video image at the time of the time stamp are held in association with each other.

The format of the time stamp is "[time]:[minute]:[second], [frame number]". Then, the coordinates associated with the time stamp indicate the position on the projection plane with one piece of the above-mentioned projection plane as one unit. In other words, in this example, a video image of "frame number 00" indicates that the video image is projected at coordinates (0,0) at the time "00:00:00. Then, a video image of "frame number 01" is projected at coordinates (−0.2,0) at the time "00:00:01". A video image of "frame number 02" is projected at coordinates (−0.4,0) at the time "00:00:02". A video image of "frame number 03" is projected at coordinates (−0.6,0) at the time "00:00:03". A video image of "frame number 04" is projected at coordinates (−0.8,0) at the time "00:00:04". A video image of "frame number 05" is projected at coordinates (−1,0) at the time "00:00:05". In other words, in the first example, the motion is specified as being shifted in the Y-axis direction by every frame "−0.2" from the reference position (0,0) at the beginning and then to (−1,0).

FIG. 7 is a diagram illustrating a second example of the projection motion data 20 according to the embodiment of the present technology. In the second example of the projection motion data 20, the time stamp, the coordinates of the video image at the time of the time stamp, and the interpolation method are held in association with one another. In the first example described above, the video image position at each time is held. However, in this second example, the interpolation method is specified. Thus, it is possible to avoid specifying the coordinates one by one in the middle of transition.

Linear interpolation (Linear), spline interpolation (Spline), or the like can be used as the interpolation method. The example in this figure indicates the projection at the coordinates (0,0) at the time "00:00:00" and then the projection interpolated by the linear interpolation to the coordinate (−1,0) at the time "00:00:05". In other words, the contents to be projected are similar to those in the above-described first example.

In a case where the interpolation method according to the second example is specified, the projection motion data acquisition unit 120 may convert it into the format according to the first example.

[Conversion to Attitude Data]

Figure 8:
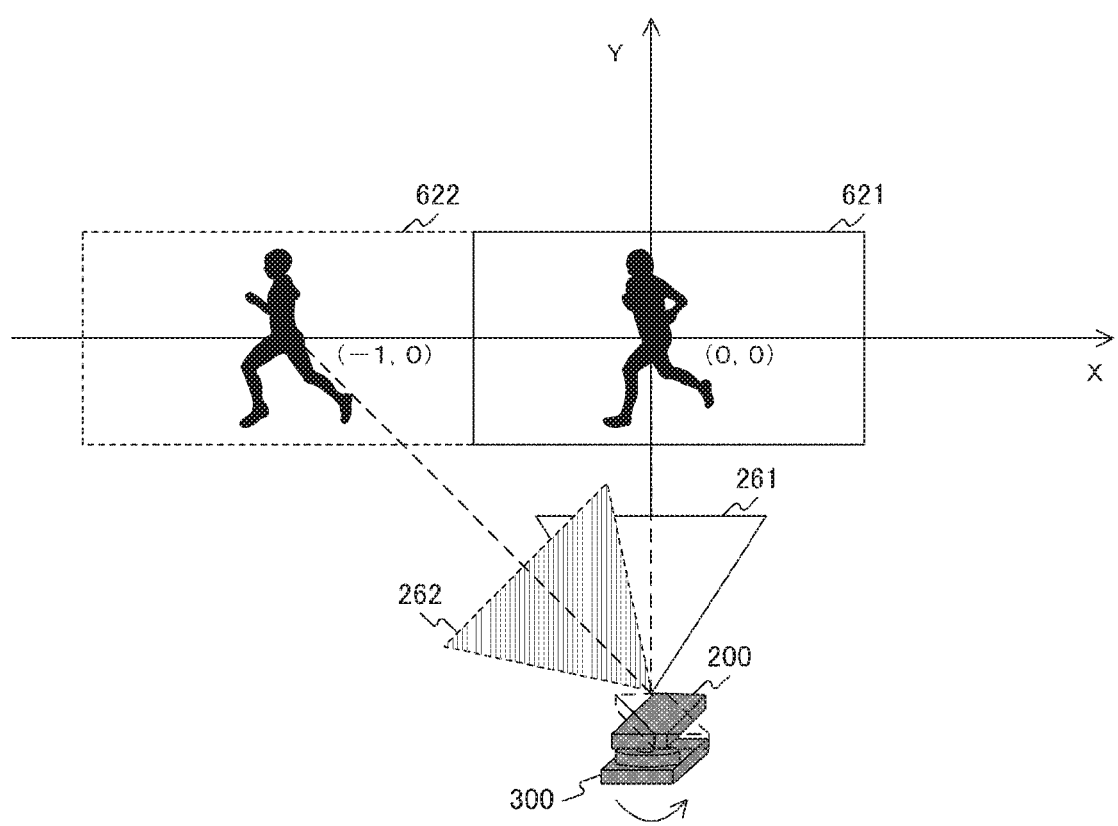
FIG. 8 is a diagram illustrating a schematic example of a change in attitude of a projector 200 according to an embodiment of the present technology.
Figure 9:
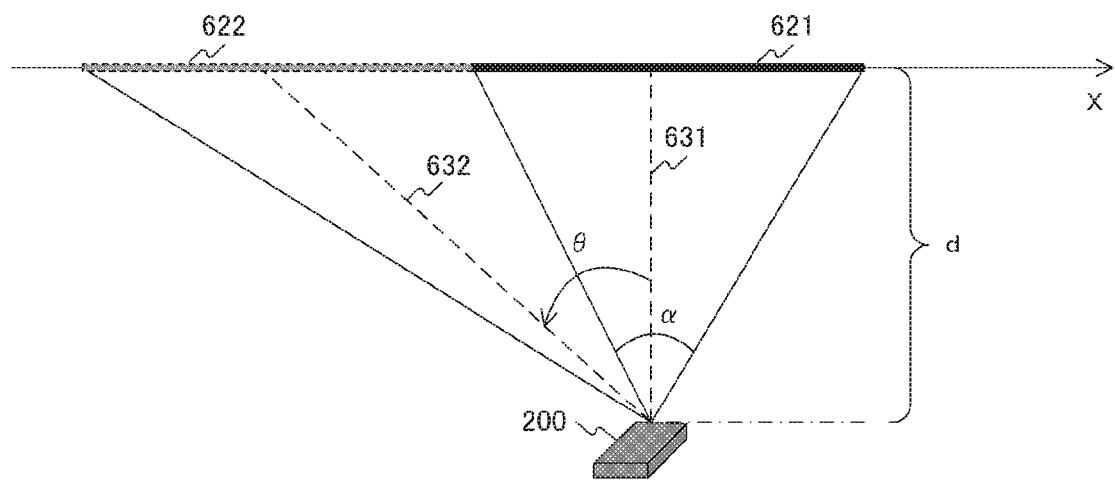
FIG. 9 is a diagram illustrating an example of a change in attitude of the projector 200 in the horizontal direction according to an embodiment of the present technology.

FIG. 8 is a diagram illustrating an overview example of a change in attitude of the projector 200 according to the embodiment of the present technology. FIG. 9 is a diagram illustrating an example of a change in attitude of the projector 200 in the horizontal direction according to the embodiment of the present technology. Here, the description is given of a change in the attitude of the projector 200 when the transition from the projection position of a video image 621 at the coordinate (0,0) to the projection position of a video image 622 at the coordinate (−1,0) is performed.

The projector 200 performs projection 261 perpendicular to the projection plane and projects the video image 621 at the coordinates (0,0). Then, it is assumed that the cradle 300 is rotated θ degrees counterclockwise in the horizontal direction to project the video image 622 at the coordinates (−1,0) from the projector 200. In other words, the angle between a center line 631 in projecting the video image 621 and a center line 632 in projecting the video image 622 is θ degrees. Moreover, although the rotation angle θ also depends on the distortion correction method, it is assumed, in this example, that distortion correction is performed with the center of the projection plane as a reference.

It is assumed that the projector 200 is installed in a position at a distance d from the projection plane. In addition, it is assumed that the video image 621 is projected from the projector 200 at the horizontal angle of view α with respect to the projection plane.

In this case, the rotation angle θ is represented by the following expression.

$$\theta = \tan^{-1}((2d \cdot \tan(\alpha/2))/d)$$
$$= \tan^{-1}(2 \cdot \tan(\alpha/2))$$

In a similar way, assuming that the video image 621 is projected from the projector 200 at the vertical angle of view β with respect to the projection plane, the rotation angle φ in the vertical direction of the cradle 300 for projecting the video image at the coordinates (0,1) from the projector 200 is represented by the following expression.

$$\phi = \tan^{-1}((2d \cdot \tan(\beta/2))/d)$$
$$= \tan^{-1}(2 \cdot \tan(\beta/2))$$

In this way, it is possible for the motion conversion unit 140 to convert the coordinates (x,y) of the projection motion data into the rotation angle (θ, φ) of the attitude data.

FIG. 10 is a diagram illustrating a first example of the attitude data 40 according to the embodiment of the present technology. In the first example of the attitude data 40, the time stamp and the rotation angle at the time indicated by the time stamp are held in association with each other.

The format of the time stamp is "[time]: [minute]: [second], [frame number]". The rotation angle associated with the time stamp is represented as (horizontal rotation angle θ, vertical rotation angle φ). The first example is an image in which the output from the motion conversion unit 140 is saved without any modification, and information on every frame is necessary, which is likely to increase the data amount.

FIG. 11 is a diagram illustrating a second example of the attitude data 40 according to the embodiment of the present technology. In the second example of the attitude data 40, the time stamp, the rotation angle at the time indicated by the time stamp, and the attitude velocity are held in association with one another. Although the rotation angle at each time is held in the first example described above, the second example allows the data amount to be reduced by specifying the attitude velocity.

In this example, at the time of the time stamp "00:00:00, 00", the cradle 300 starts to move at the rotation angle (0, 0) and the attitude velocity (θv, φv). Then, the time of the time stamp "00:00: 00, 05" indicates that the cradle 300 stops moving at the rotation angle (θ5, φ5) and the attitude velocity (0, 0).

[Distortion Correction]

FIG. 12 is a diagram illustrating an example of a projected image at the coordinates (0,0) by the projector 200 according to the embodiment of the present technology. This illustrates a video image 641 obtained by projecting a video image 501 at the coordinate (0,0) of the projection plane 600. At the coordinates (0,0), the video image 641 is projected in the direction perpendicular to the projection plane, so in this state, distortion does not occur in the video image 641.

FIG. 13 is a diagram illustrating an example of a projected image at coordinates (−1,0) by the projector 200 according to the embodiment of the present technology. At the coordinates (−1,0), the projection is performed at a position shifted from the position perpendicular to the projection plane, so in this state, the video image will be distorted like a video image 642.

On the other hand, the correction unit 150 performs trapezoidal correction for occurring distortion of the direction opposite to the projection plane to generate a video image 502. Then, when the corrected video image 502 is projected at the coordinate (−1,0), a video image 643 projected onto the projection plane 600 becomes a video image without distortion.

Moreover, here, the description is given of the example of trapezoidal correction by oblique projection with rotation of the cradle 300 as distortion correction by the correction unit 150, but size correction, brightness correction, or the like can be performed as part of distortion correction. Even in such a case, the correction in the video image converter 100 is not necessary to be real time and does not become the load in playing back the moving picture in the projector 200.

[Processing Procedure]

Figure 14:
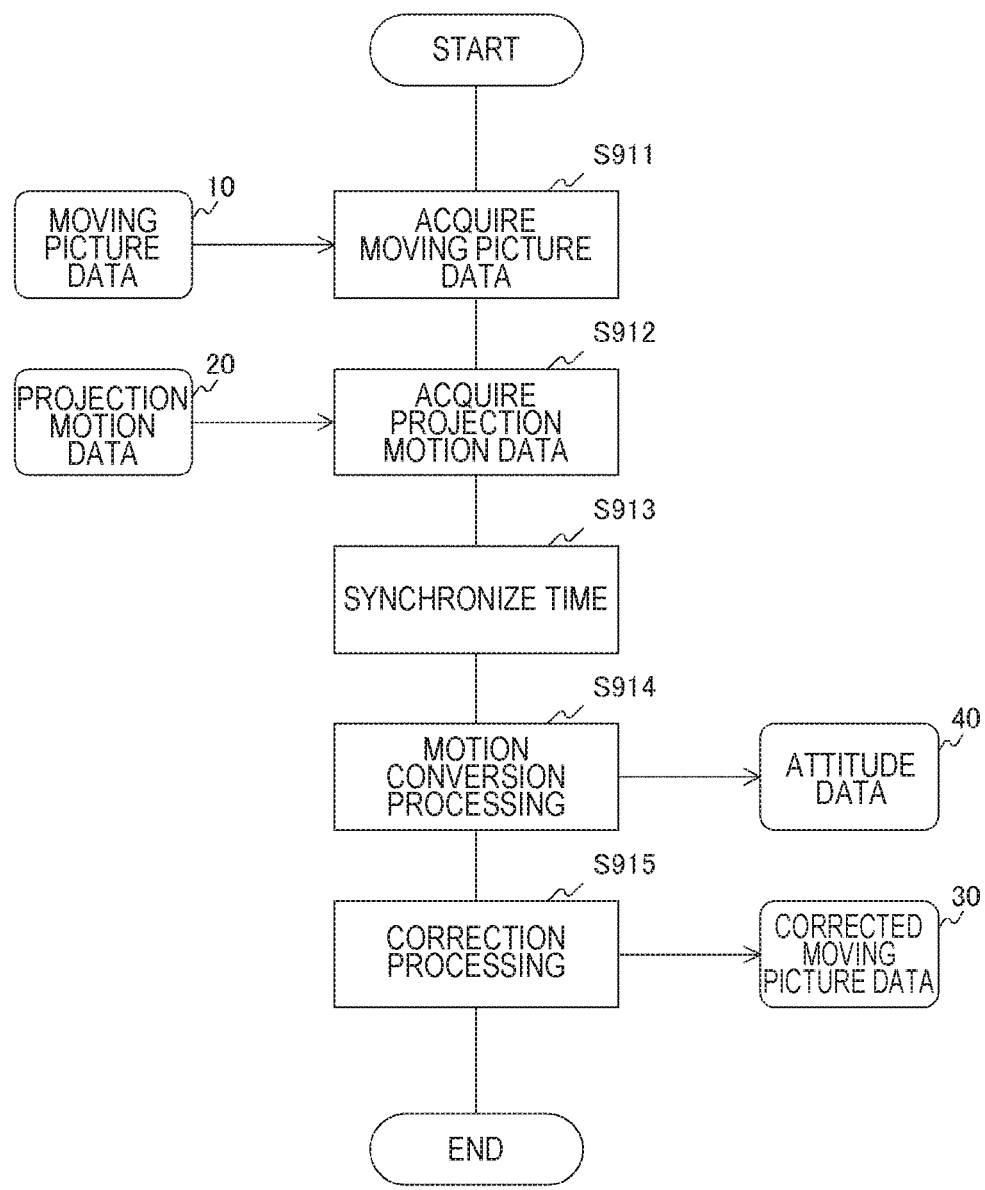
FIG. 14 is a flowchart illustrating an example of a processing procedure of the video image converter 100 according to an embodiment of the present technology.

FIG. 14 is a flowchart illustrating an example of a processing procedure of the video image converter 100 according to the embodiment of the present technology.

The moving picture data acquisition unit 110 acquires the moving picture data 10 (step S911). In addition, the projection motion data acquisition unit 120 acquires the projection motion data 20 (step S912). Then, the conversion synchronization unit 130 synchronizes the frame video image of the moving picture data output from the moving picture data acquisition unit 110 with the projection motion data output from the projection motion data acquisition unit 120 in accordance with the respective time stamps (step S913).

The motion conversion unit 140 converts the projection motion data output from the conversion synchronization unit 130 into the attitude data of the projector 200 and stores the attitude data 40 in the storage unit (step S914). In addition, the correction unit 150 corrects the frame video image of the moving picture data output from the conversion synchronization unit 130 in accordance with the attitude data supplied from the motion conversion unit 140, and stores the corrected moving picture data 30 in the storage unit (step S915).

Figure 15:
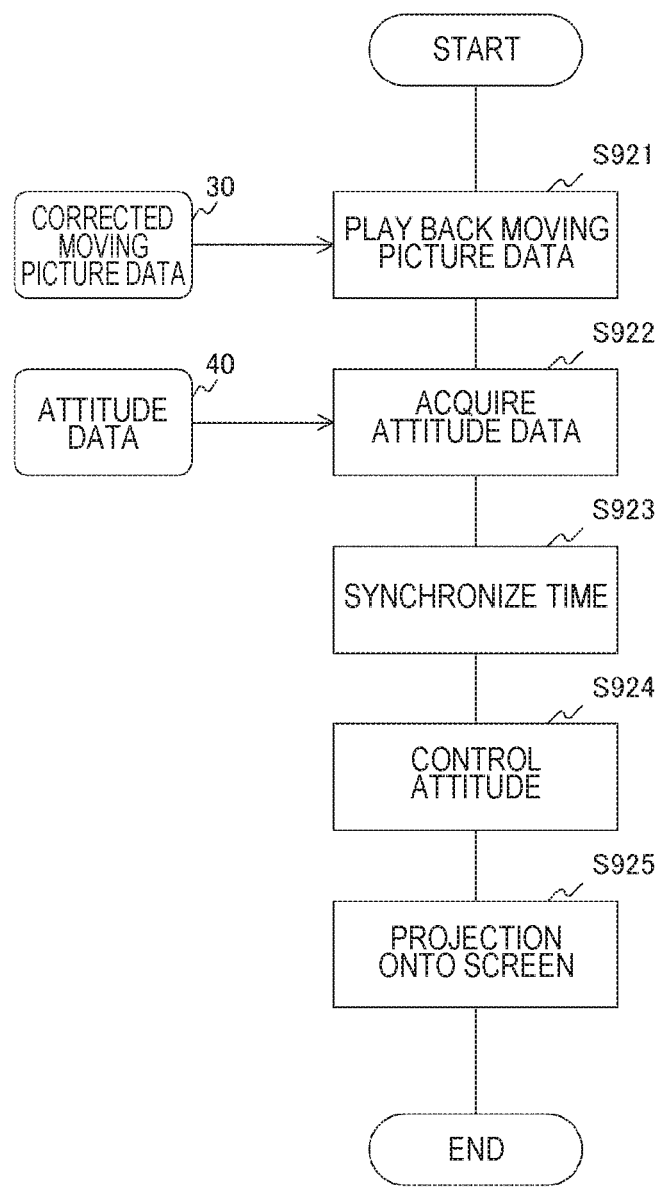
FIG. 15 is a flowchart illustrating an example of a processing procedure of the projector 200 according to an embodiment of the present technology.

FIG. 15 is a flowchart illustrating an example of a processing procedure of the projector 200 according to the embodiment of the present technology.

The moving picture playback unit 210 plays back the corrected moving picture data 30 stored in the storage unit (step S921). In addition, the attitude data acquisition unit 220 acquires the attitude data 40 stored in the storage unit and outputs the attitude data and its time stamp (step S922). Then, the projection synchronization unit 230 synchronizes the frame video image of the moving picture data played back by the moving picture playback unit 210 and the attitude data acquired by the attitude data acquisition unit 220 in accordance with the respective time stamps (step S923).

The attitude data supply unit 270 supplies the attitude data synchronized by the projection synchronization unit 230 to the cradle 300 (step S924). This allows the attitude of the projector 200 to be changed. The projection unit 260 projects the frame video image of the moving picture data synchronized by the projection synchronization unit 230 onto the projection plane (screen) (step S925).

In this way, in the embodiment of the present technology, the video image converter 100 converts the moving picture data 10 and the projection motion data 20 into the corrected moving picture data 30 and the attitude data 40, respectively, which are stored in the storage unit. This makes it possible to suppress the load in playing back the moving picture in the projector 200.

2. Modification

In the above-described embodiment, the corrected moving picture data 30 and the attitude data 40 are synchronized in the projector 200, but this synchronization can be performed in the cradle 300. In this modification, the corrected moving picture data 30 and the attitude data 40 are synchronized in the cradle 300.

Figure 16:
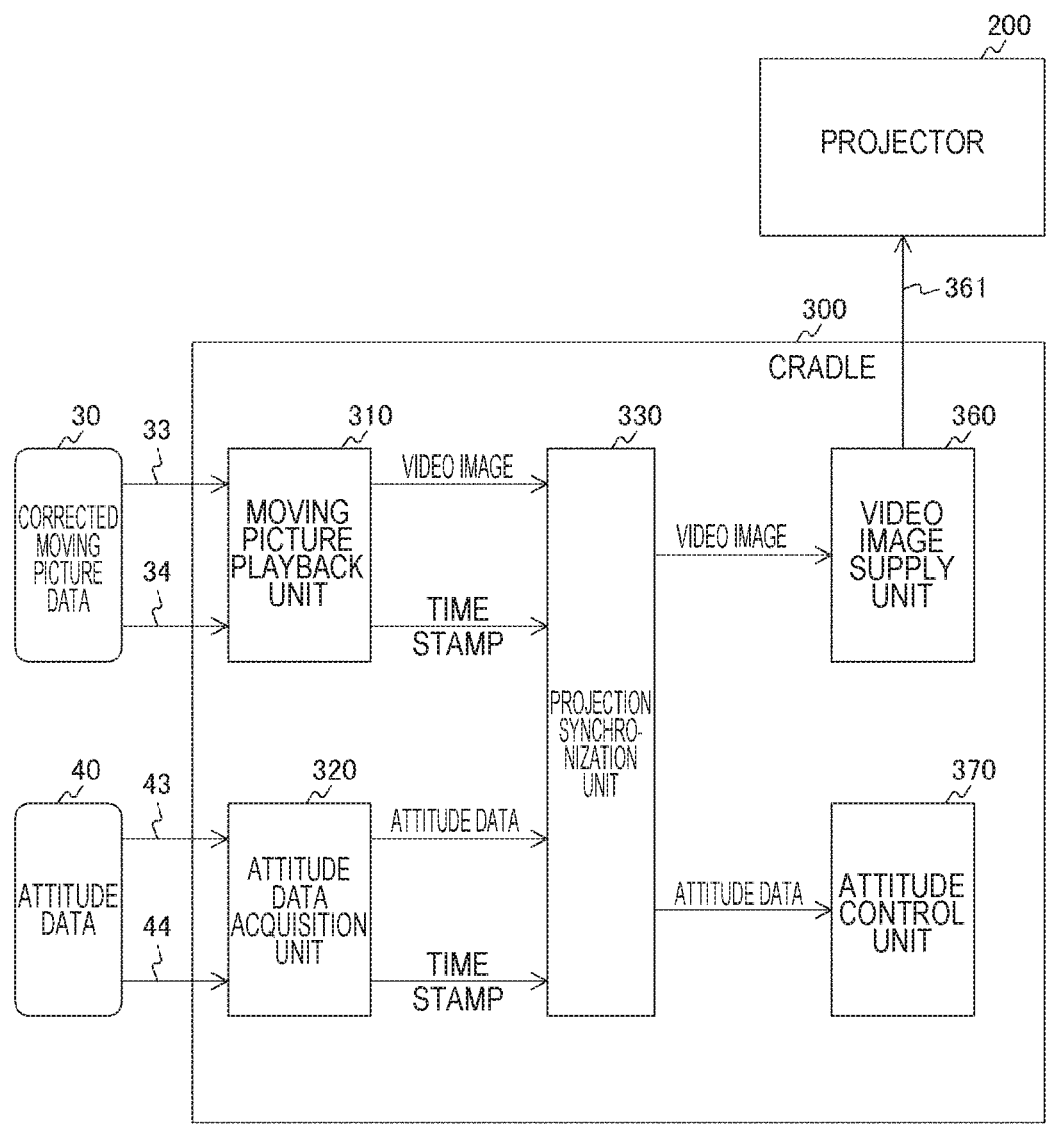
FIG. 16 is a diagram illustrating an exemplary configuration of a cradle 300 according to a modification of the embodiment of the present technology.

FIG. 16 is a diagram illustrating an exemplary configuration of the cradle 300 according to the modification of the embodiment of the present technology. The cradle 300 according to this modification includes a moving picture playback unit 310, an attitude data acquisition unit 320, a projection synchronization unit 330, a video image supply unit 360, and an attitude control unit 370. The moving picture playback unit 310, the attitude data acquisition unit 320, and the projection synchronization unit 330 are respectively similar to the moving picture playback unit 210, the attitude data acquisition unit 220, and the projection synchronization unit 230 according to the embodiment, so the detailed description thereof will be omitted.

The video image supply unit 360 supplies the frame video image of the moving picture data synchronized by the projection synchronization unit 330 to the projector 200 via a signal line 361. The projector 200 receives this frame video image and projects it onto the projection plane.

The attitude control unit 370 controls the attitude of the projector 200 on the basis of the attitude data synchronized by the projection synchronization unit 330.

As described above, according to the modification of the embodiment of the present technology, the corrected moving picture data 30 and the attitude data 40 are synchronized with each other in the cradle 300, and the frame video image is supplied from the cradle 300 to the projector 200.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a compact disc (CD), a mini disc (MD), and a digital versatile disc (DVD), a memory card, and a Blu-ray disc (registered trademark) can be used.

Note that the effects described in the present specification are not necessarily limited, and any effect described in the present disclosure may be exhibited.

Additionally, the present technology may also be configured as below.

(1)

A projection system including:

a video image converter configured to generate attitude data of a projector on a basis of motion data in projecting moving picture data, store the attitude data in a storage unit, correct the moving picture data in accordance with the attitude data, and store the corrected moving picture data in the storage unit;

the projector configured to play back the corrected moving picture data stored in the storage unit and project the corrected moving picture data onto a projection plane; and a cradle configured to support the projector and change an attitude of the projector in accordance with the attitude data stored in the storage unit.

(2)

The projection system according to (1), in which the video image converter includes a conversion synchronization unit configured to synchronize the moving picture data with the motion data, a conversion unit configured to convert the motion data into the attitude data, and a correction unit configured to correct the moving picture data in accordance with the motion data to generate the corrected moving picture data.

(3)

The projection system according to (2), in which the correction unit corrects distortion of the moving picture data in the projection plane in accordance with the motion data.

(4)

The projection system according to any of (1) to (3), in which the projector includes a moving picture playback unit configured to play back the corrected moving picture data stored in the storage unit, a projection synchronization unit configured to synchronize the played video image with the attitude data stored in the storage unit, a projection unit configured to project the synchronized video image onto the projection plane, and an attitude data supply unit configured to supply the synchronized attitude data to the cradle.

(5)

The projection system according to any of (1) to (4), in which the cradle includes a moving picture playback unit configured to play back the corrected moving picture data stored in the storage unit, a projection synchronization unit configured to synchronize the played video image with the attitude data stored in the storage unit, a video image supply unit configured to supply the synchronized video image to the projector, and an attitude control unit configured to control an attitude of the projector in accordance with the synchronized attitude data.

(6)

A video image converter including:

a conversion synchronization unit configured to synchronize moving picture data with motion data in projecting the moving picture data;

a conversion unit configured to generate attitude data of a projector on a basis of the motion data and store the attitude data in a storage unit; and a correction unit configured to correct the moving picture data in accordance with the motion data and store the corrected moving picture data in the storage unit.

(7)

A projector including:

a moving picture playback unit configured to play back moving picture data stored in a storage unit;

a projection synchronization unit configured to synchronize the played video image with attitude data stored in the storage unit;

a projection unit configured to project the synchronized video image onto the projection plane; and an attitude data supply unit configured to supply the synchronized attitude data to a mounting-target cradle.

(8)

A cradle including:

a moving picture playback unit configured to play back moving picture data stored in a storage unit;

a projection synchronization unit configured to synchronize the played video image with attitude data of a projector stored in the storage unit;

a video image supply unit configured to supply the synchronized video image to the projector; and an attitude control unit configured to control an attitude of the projector in accordance with the synchronized attitude data.

(9)

A video image conversion method including:

a moving picture data acquisition procedure of acquiring moving picture data by a moving picture data acquisition unit;

a motion data acquisition procedure of acquiring motion data in projecting the moving picture data by a motion data acquisition unit;

a conversion synchronization procedure of synchronizing the acquired moving picture data with the acquired motion data by a conversion synchronization unit;

a conversion procedure of generating attitude data of a projector on a basis of the motion data and storing the attitude data in a storage unit by a conversion unit; and a correction procedure of correcting the moving picture data in accordance with the motion data and storing the corrected moving picture data in the storage unit by a correction unit.

(10)

A video image projection method including: a moving picture playback procedure of playing back moving picture data stored in a storage unit by a moving picture playback unit;

an attitude data acquisition procedure of acquiring attitude data stored in the storage unit by an attitude data acquisition unit;

a projection synchronization procedure of synchronizing the played video image with the acquired attitude data by a projection synchronization unit;

an attitude data control procedure of changing an attitude of a projector in accordance with the synchronized attitude data by an attitude control unit; and a projection procedure of projecting the synchronized video image onto the projection plane from the projector by a projection unit.

REFERENCE SIGNS LIST

10 moving picture data
20 projection motion data 30 corrected moving picture data
40 attitude data
100 video image converter
110 moving picture data acquisition unit
120 projection motion data acquisition unit
130 conversion synchronization unit
140 motion conversion unit
150 correction unit
200 projector
210 moving picture playback unit
220 attitude data acquisition unit
230 projection synchronization unit
260 projection unit
270 attitude data supply unit
300 cradle
310 moving picture playback unit
320 attitude data acquisition unit
330 projection synchronization unit
360 video image supply unit
370 attitude control unit

The invention claimed is:

1. A projection system, comprising: a projector; a cradle; and a video image converter configured to: generate attitude data of the projector based on motion data, wherein the motion data is associated with projection of moving picture data, the moving picture data includes a video image, and the motion data includes a time stamp, coordinates of the video image corresponding to the time stamp, and an interpolation associated with the time stamp and the coordinates of the video image; store the attitude data in a storage unit; correct the moving picture data based on the attitude data; and store the corrected moving picture data in the storage unit, wherein the projector includes: a moving picture playback unit configured to play back the corrected moving picture data stored in the storage unit, wherein the corrected moving picture data includes a corrected video image; a projection synchronization unit configured to synchronize the corrected video image with the attitude data stored in the storage unit; a projection unit configured to project the corrected video image onto a projection plane at a specific angle of view based on the synchronization of the corrected video image, wherein the specific angle of view is with respect to the projection plane; and an attitude data supply unit configured to supply the attitude data to the cradle based on the synchronization of the corrected video image, and the cradle is configured to: support the projector; and change an attitude of the projector based on the supplied attitude data, wherein the supplied attitude data includes a rotation angle of the cradle, and the rotation angle of the cradle is based on the specific angle of view, and a distance between the projector and the projection plane.

2. The projection system according to claim 1, wherein the video image converter includes:
a conversion synchronization unit configured to synchronize the moving picture data with the motion data,
a conversion unit configured to convert the motion data into the attitude data based on the synchronization of the moving picture data, and
a correction unit configured to:
correct the moving picture data based on the attitude data and the synchronization of the moving picture data; and
generate the corrected moving picture data.

3. The projection system according to claim 2, wherein the correction unit is further configured to correct distortion of the moving picture data in the projection plane based on the motion data.

4. A video image converter, comprising: a conversion synchronization unit configured to synchronize moving picture data with motion data, wherein the motion data is associated with projection of the moving picture data, the moving picture data includes a video image, and the motion data includes a time stamp, coordinates of the video image corresponding to the time stamp, and an interpolation associated with the time stamp and the coordinates of the video image; a conversion unit configured to: generate attitude data of a projector based on the motion data and the synchronization of the moving picture data; and store the attitude data in a storage unit; and a correction unit configured to: correct the moving picture data based on the attitude data stored in the storage unit and the synchronization of the moving picture data; and store the corrected moving picture data in the storage unit, wherein the projector includes: a moving picture playback unit that plays back the corrected moving picture data stored in the storage unit, wherein the corrected moving picture data includes a corrected video image, a projection synchronization unit that synchronizes the corrected video image with the attitude data stored in the storage unit, a projection unit that projects the corrected video image onto a projection plane at a specific angle of view based on the synchronization of the corrected video image, wherein the specific angle of view is with respect to the projection plane, and an attitude data supply unit that supplies the attitude data to a cradle based on the synchronization of the corrected video image, the cradle changes an attitude of the projector based on the supplied attitude data, the supplied attitude data includes a rotation angle of the cradle, and the rotation angle of the cradle is based on the specific angle of view, and a distance between the projector and the projection plane.

5. A projector, comprising: a moving picture playback unit configured to play back first moving picture data stored in a storage unit, wherein the first moving picture data includes a first video image; a projection synchronization unit configured to synchronize the first video image with attitude data of the projector, wherein the attitude data is stored in the storage unit, the attitude data is based on motion data, the motion data is associated with projection of second moving picture data, the second moving picture data includes a second video image, and the motion data includes a time stamp, coordinates of the second video image corresponding to the time stamp, and an interpolation associated with the time stamp and the coordinates of the second video image; a projection unit configured to project, based on the synchronization, the first video image onto a projection plane at a specific angle of view, wherein the specific angle of view is with respect to the projection plane; and an attitude data supply unit configured to supply the attitude data to a mounting-target cradle based on the synchronization, wherein the mounting-target cradle changes an attitude of the projector based on the supplied attitude data, the supplied attitude data includes a rotation angle of the mounting-target cradle, and the rotation angle of the mounting-target cradle is based on the specific angle of view, and a distance between the projector and the projection plane.

6. A cradle, comprising: a moving picture playback unit configured to play back first moving picture data stored in a storage unit, wherein the first moving picture data includes a first video image; a projection synchronization unit configured to synchronize the first video image with attitude data of a projector, wherein the attitude data is stored in the storage unit, the attitude data is based on motion data, the motion data is associated with projection of second moving picture data, the second moving picture data includes a second video image, and the motion data includes a time stamp, coordinates of the second video image corresponding to the time stamp, and an interpolation associated with the time stamp and the coordinates of the second video image; a video image supply unit configured to supply, based on the synchronization, the first video image to the projector, wherein the projector projects the first video image onto a projection plane at a specific angle of view, and the specific angle of view is with respect to the projection plane; and an attitude control unit configured to control an attitude of the projector based on the attitude data and the synchronization, wherein the attitude data includes a rotation angle of the cradle, and the rotation angle of the cradle is based on the specific angle of view, and a distance between the projector and the projection plane.

7. A video image conversion method, comprising: acquiring, by a moving picture data acquisition unit of a video image converter, moving picture data; acquiring, by a motion data acquisition unit of the video image converter, motion data associated with projection of the moving picture data, wherein the moving picture data includes a video image, and the motion data includes a time stamp, coordinates of the video image corresponding to the time stamp, and an interpolation associated with the time stamp and the coordinates of the video image; synchronizing, by a conversion synchronization unit of the video image converter, the acquired moving picture data with the acquired motion data; generating, by a conversion unit of the video image converter, attitude data of a projector based on the acquired motion data; storing, by the conversion unit, the attitude data in a storage unit; correcting, by a correction unit of the video image converter, the moving picture data based on the attitude data stored in the storage unit and the synchronization of the moving picture data; and storing, by the correction unit, the corrected moving picture data in the storage unit, wherein the projector includes: a moving picture playback unit that plays back the corrected moving picture data stored in the storage unit, wherein the corrected moving picture data includes a corrected video image, a projection synchronization unit that synchronizes the corrected video image with the attitude data stored in the storage unit, a projection unit that projects the corrected video image onto a projection plane at a specific angle of view based on the synchronization of the corrected video image, wherein the specific angle of view is with respect to the projection plane, and an attitude data supply unit that supplies the attitude data to a cradle based on the synchronization of the corrected video image, the cradle changes an attitude of the projector based on the supplied attitude data, the supplied attitude data includes a rotation angle of the cradle, and the rotation angle of the cradle is based on the specific angle of view, and a distance between the projector and the projection plane.

8. A video image projection method, comprising: playing back, by a moving picture playback unit, first moving picture data stored in a storage unit, wherein the first moving picture data includes a first video image; acquiring, by an attitude data acquisition unit, attitude data stored in the storage unit, wherein the attitude data is based on motion data, the motion data is associated with projection of second moving picture data, the second moving picture data includes a second video image, and the motion data includes a time stamp, coordinates of the second video image corresponding to the time stamp, and an interpolation associated with the time stamp and the coordinates of the second video image; synchronizing, by a projection synchronization unit, the first video image with the attitude data; projecting, by a projection unit, the video image onto a projection plane at a specific angle of view based on the synchronization, wherein the specific angle of view is with respect to the projection plane; and changing, by an attitude control unit, an attitude of a projector based on the attitude data and the synchronization, wherein the attitude data includes a rotation angle of a cradle, and the rotation angle of the cradle is based on the specific angle of view, and a distance between the projector and the projection plane.

* * * * *